United States Patent
Yamakawa et al.

(10) Patent No.: US 6,273,681 B1
(45) Date of Patent: Aug. 14, 2001

(54) ROTOR BLADE FLAP DRIVING APPARATUS

(75) Inventors: Eiichi Yamakawa; Tatsuro Hongu, both of Kakamigahara (JP)

(73) Assignee: Advanced Technology Institute of Commuter-Helicopter, Ltd., Gifu (JP)

( * ) Notice: Subject to any disclaimer, the term of this patent is extended or adjusted under 35 U.S.C. 154(b) by 0 days.

(21) Appl. No.: 09/517,722

(22) Filed: Mar. 2, 2000

(30) Foreign Application Priority Data

Mar. 3, 1999 (JP) .................................................. 11-055832

(51) Int. Cl.[7] .................................................. B64C 27/615
(52) U.S. Cl. ................................ 416/23; 74/110; 310/328
(58) Field of Search .......................... 416/23, 24; 74/110, 74/105; 310/311, 328

(56) References Cited

U.S. PATENT DOCUMENTS

| | | | |
|---|---|---|---|
| Re. 31,049 | * 10/1982 | Brian ................................... | 74/110 X |
| 430,436 | * 6/1890 | Richardson .............................. | 74/110 |
| 2,148,921 | * 2/1939 | Allen ....................................... | 416/23 |
| 2,244,215 | * 6/1941 | Pateras Pescara ..................... | 74/110 |
| 2,625,997 | * 1/1953 | Doak ....................................... | 416/23 |
| 2,892,502 | * 6/1959 | Donovan ................................. | 416/23 |
| 3,103,701 | * 9/1963 | Calchera et al. .................. | 74/100 X |
| 3,122,664 | * 2/1964 | Loeb ................................... | 74/110 X |
| 3,129,769 | 4/1964 | Hofbauer et al. . | |
| 3,376,755 | * 4/1968 | Joyce, Jr. ................................ | 74/110 |
| 3,892,138 | * 7/1975 | Vomberg ................................. | 74/110 |
| 4,043,523 | 8/1977 | Bartoe, Jr. . | |
| 4,093,405 | * 6/1978 | Brian ....................................... | 74/110 |
| 4,111,601 | * 9/1978 | Richard .............................. | 416/23 X |
| 4,355,955 | * 10/1982 | Kisovec .................................. | 416/23 |
| 4,514,143 | * 4/1985 | Campbell ............................... | 416/23 |
| 4,669,606 | * 6/1987 | Cisko ..................................... | 74/110 |
| 5,255,871 | * 10/1993 | Ikeda .................................. | 416/24 X |
| 5,387,083 | 2/1995 | Larson et al. . | |
| 5,409,183 | * 4/1995 | Gunsallus ........................... | 416/24 X |
| 5,639,215 | 6/1997 | Yamakawa et al. . | |
| 6,152,692 | * 11/2000 | Aubry .................................... | 416/24 |

FOREIGN PATENT DOCUMENTS

| | | |
|---|---|---|
| 0 947 422 | 10/1999 | (EP) . |
| 8-258795 | 10/1996 | (JP) . |
| 10-271852 | 10/1998 | (JP) . |
| 2907335 | 4/1999 | (JP) . |
| 2933274 | 5/1999 | (JP) . |

* cited by examiner

Primary Examiner—John E. Ryznic
(74) Attorney, Agent, or Firm—Wenderoth, Lind & Ponack, L.L.P.

(57) ABSTRACT

An actuator and first to fourth links constitute a first displacement magnifying mechanism. An input shaft which is fixed in a basal end of the first and second links, a support shaft which is fixed in a basal end of the third and fourth links, and a displacement magnifying lever constitute a second displacement magnifying mechanism. In the displacement magnifying lever, an intermediate portion is angularly displaceably coupled to a tip end of the support shaft, a tip end of the input shaft is angularly displaceably coupled to one end, and an output rod is angularly displaceably coupled to another end. The expansion and contraction of the actuator are magnified by the first and second displacement magnifying mechanisms so as to drive a flap angularly via output rod. According to this configuration, the displacement of the actuator can be largely magnified so that the flap can be sufficiently angularly displaced in the vertical direction and in a reciprocal manner.

10 Claims, 6 Drawing Sheets

ROTOR BLADE FLAP DRIVING APPARATUS

BACKGROUND OF THE INVENTION

1. Field of the Invention

The present invention relates to a rotor blade flap driving apparatus for driving a flap provided to a trailing edge of each rotor blade of a helicopter or the like.

2. Description of the Related Art

In recent years, there have been increasing demands for commuter helicopters which take off and land on heliports in urban areas. To realize this, noise reduction is highly required. As an effective anti-noise measure, a method has been considered in which a flap is attached to each rotor blade of a helicopter and the flap is driven at a high speed of approximately 30 Hz to 50 Hz and precisely controlled to thereby improve the aerodynamic characteristics of the rotor blades.

As an actuator for use in a flap driving apparatus of such a rotor blade is employed a small-size and lightweight one because the actuator must be housed in the rotor blade. For example, a stack-type piezo-actuator in which thin plates of piezoceramic elements are stacked is used, however, in such a stack-type piezo-actuator, since the amount of displacement is small, it is required to magnify the displacement to drive the flap.

In a configuration in which the displacement of the actuator is magnified simply with a lever or the like, however, it is difficult to obtain a magnification factor large enough to make an angular displacement to drive the flap.

SUMMARY OF THE INVENTION

It is an object of the invention to provide a rotor blade flap driving apparatus provided with displacement magnifying means which makes it possible to achieve a magnification factor large enough to make an angular displacement to drive the flap.

The invention provides a rotor blade flap driving apparatus comprising:

a blade;

a flap angularly displaceably attached to a trailing edge of the blade;

an actuator housed in the blade, which expands and contracts in a spanwise direction of the blade thereof; and displacement magnifying means for magnifying the displacements of the actuator and transmitting the magnified displacements to the flap to angularly displace the flap in a vertical direction thereof, the displacement magnifying means including:

a first displacement magnifying mechanism having:

a first link disposed on one side portion of the actuator, one end of the first link being angularly displaceably coupled to one end of the actuator, a second link disposed on the one side portion of the actuator, one end of the second link being angularly displaceably coupled to another end of the actuator, another end of the second link being angularly displaceably coupled to another end of the first link, a third link disposed on the other side portion of the actuator, one end of the third link being angularly displaceably coupled to the one end of the actuator; and a fourth link disposed on the other side portion of the actuator, one end of the fourth link being angularly displaceably coupled to the other end of the actuator, another end of the fourth link being angularly displaceably coupled to another end of the third link, the first displacement magnifying mechanism being a mechanism for magnifying expansion and contraction displacements of the actuator by moving in a direction along which the coupling portion between the first and second links, and the coupling portion between the third and fourth links approach and separate from each other in accordance with expansion and contraction of the actuator; and a second displacement magnifying mechanism having an input member which is coupled to the first displacement magnifying mechanism and output rod, one end of which is coupled to the flap for magnifying a displacement of the first displacement magnifying mechanism.

According to the invention, a triangular link mechanism is configured on the one side portion of the actuator by the first and second links, and, when the actuator expands or contracts, the coupling portion between the first and second links is displaced in a direction along which the coupling portion approaches or separates from the actuator. Similarly, a triangular link mechanism is configured on the other side portion of the actuator by the third and fourth links, and, when the actuator expands or contracts, the coupling portion between the third and fourth links is displaced in a direction along which the coupling portion approaches or separates from the actuator.

Therefore, by operating the actuator to expand or contract, the coupling portion between the first and second links, and the coupling portion between the third and fourth links are largely displaced in a direction along which the coupling portions approach or separate from each other, so that the amount of the displacement of the actuator can be magnified. The displacement which has been magnified by the first displacement magnifying mechanism is further magnified by the second displacement magnifying mechanism, and then transmitted to the flap via output rod. In this way, the displacement of the actuator is largely magnified by the two displacement magnifying mechanisms. Even when a piezo-actuator, which produces only small amounts of the displacement, is used, therefore, the flap can be largely displaced angularly.

In the invention it is preferable that the second displacement magnifying mechanism has an input member which is connected to one of the coupling portion between the first and second links, and the coupling portion between the third and fourth links;

a support member which is connected to another one of the coupling portion between the first and second links, and the coupling portion between the third and fourth links; and a displacement magnifying member which is supported by the support member so as to be angularly displaceable about a predetermined support axis, and to which the input member is coupled so as to be angularly displaceable about an input axis that is separated from the support axis by a predetermined input arm length, and another end of the output rod is coupled to the displacement magnifying member so as to be angularly displaceable about an output axis which is separated from the support axis by an output arm length which is larger than the input arm length.

According to the invention, the support member is connected to the coupling portion between the third and fourth links, the input member is connected to the coupling portion between the first and second links, a portion, for example, an intermediate portion of the displacement magnifying member is supported by a tip end of the support member, a tip end of the input member is coupled to one end of the displacement magnifying member, and the other end of the output rod is coupled to the other end of the displacement magnifying member. When the actuator expands, the coupling portions which constitute apexes of the triangular link mechanisms are displaced in a direction along which the coupling portions approach each other. In the displacement magnifying member, while the intermediate portion which is supported by the support member is considered as the fulcrum and the one end of the displacement magnifying member to which the input member is coupled, the displacement of the output portion of the displacement magnifying member to which the output rod is coupled is magnified by a magnification factor corresponding to a ratio of the input and output arm lengths, so that the output rod is largely displaced. In this way, the flap is driven angularly via output rod while the displacement of the first displacement magnifying mechanism is further magnified by the second displacement magnifying mechanism.

In the invention it is preferable that the first to fourth links, the coupling portions between the first to fourth links and the actuator, between the first and second links, and between the third and fourth links are continuously formed by a thin rigid plate made by composite material, and the coupling portions are constructed so as to be more flexible than the links and elastically deformable.

According to the invention, the links and the coupling portions are integrally and continuously constructed by composite material, and the coupling portions are more flexible than the links and have function as elastic hinges. Therefore, the first displacement magnifying mechanism can be constructed to be lightweight. Since the links are made of composite material, the secondary angular displacement of the second displacement magnifying mechanism is absorbed, and the second displacement magnifying mechanism smoothly operates.

In the invention it is preferable that the couplings between the first to fourth links and the actuator, the first and second links, and the third and fourth links are constructed by pin hinges so as to be angularly displaced.

According to the invention, since each of the coupling portions is constructed by a pin hinge, the coupling portion can smoothly operate, so that the movement of the actuator can be properly transmitted.

In the invention it is preferable that the actuator consists of a stack-type piezo-actuator in which a plurality of piezoceramic elements which are displaced in accordance with applied voltage are stacked, and is disposed so that displacement direction of the piezoceramic elements are spanwise direction of the blade, and one end of the actuator on a side of a tip end of the blade is fixed to the blade.

When a stack-type piezo-actuator is to be operated, the piezo-actuator must be preloaded in the displacement direction so as to avoid destruction by tensile force. In the invention, the actuator is disposed along the spanwise direction of the blade, and the one end of the actuator on the side of the tip end of the blade is fixed to the blade. When the rotor blade is rotated, therefore, the actuator is automatically preloaded by the centrifugal force of the rotor blade. According to this configuration, it is not required to apply a preload by using a spring or the like, and hence the number of parts can be reduced so that the configuration can be simplified.

In the invention it is preferable that each of the first to fourth links is configured by a sub-actuator which expands and contracts in a longitudinal direction thereof, and the link expands and contracts in an opposite phase relationship with respect to expansion and contraction of the main-actuator.

According to the invention, when the sub-actuator expands, the links contract, whereby the apexes of the triangular link mechanisms which are respectively formed on the both side portions of the main-actuator are displaced in a direction along which the apexes further approach each other. By contrast, when the sub-actuator contracts, the links are caused to expand, whereby the apexes are displaced in a direction along which the apexes further separate from each other. In this way, the approaching/separating displacement of each of the apexes can be further magnified by driving the links to expand and contract in an opposite phase relationship with respect to expansion and contraction of the main-actuator.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
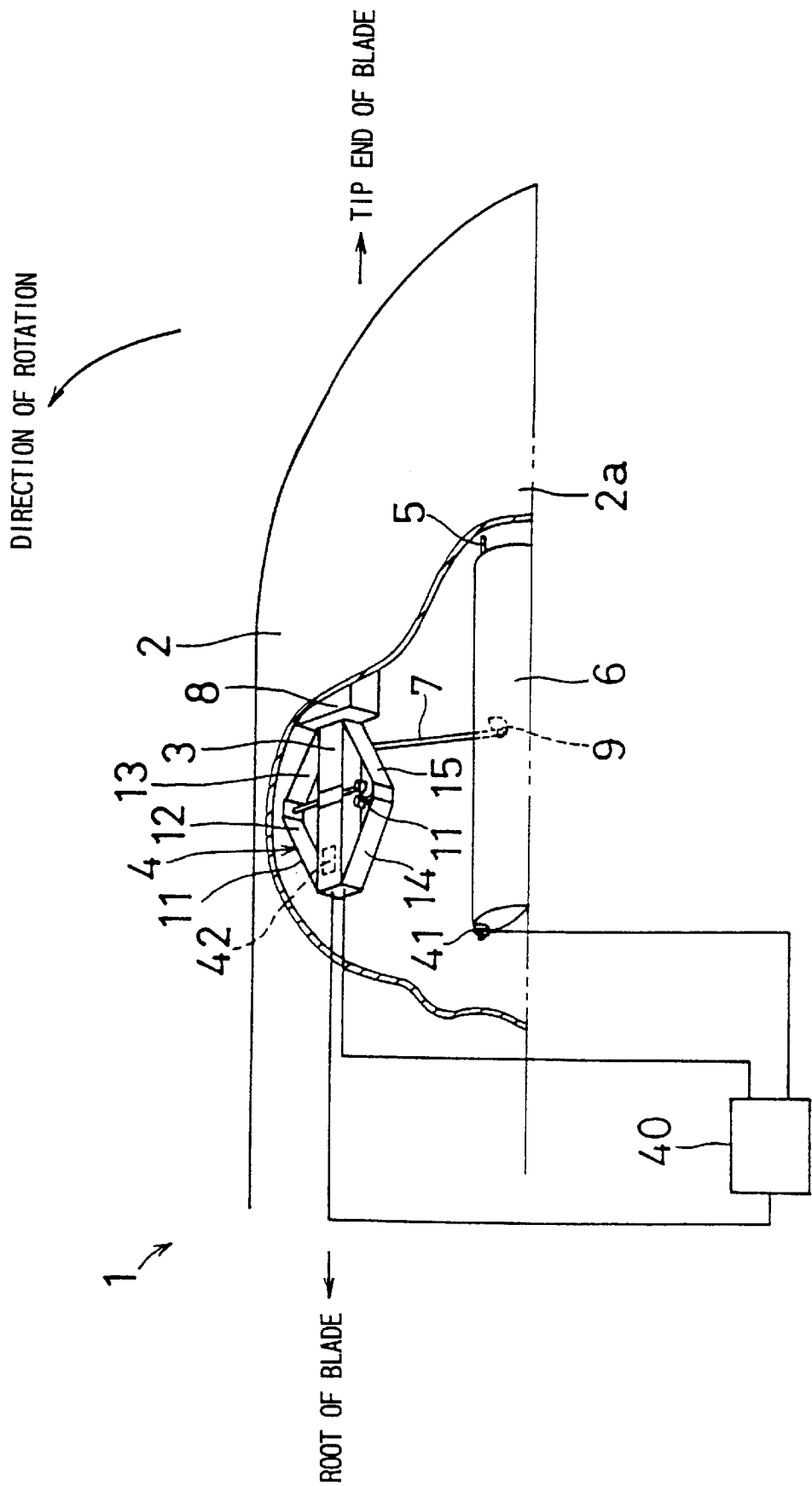
FIG. 1 is a perspective view showing the configuration of a rotor blade flap driving apparatus 1 of an embodiment of the invention.

Now referring to the drawings, preferred embodiments of the invention are described below.

FIG. 1 is a perspective view showing the configuration of a rotor blade flap driving apparatus 1 of an embodiment of the invention. The rotor blade is installed on a helicopter, which has a plurality of blades 2. In each of the blades 2, the right in FIG. 1 is the side of a tip end of the blade, and the left side is the side of a root portion of the blade. The blade is rotated in a counterclockwise direction in FIG. 1. The flap driving apparatus 1 includes the blade 2, a flap 6 which is attached to the trailing edge 2a (the lower side in FIG. 1) of the blade, an actuator 3 which is housed in the blade 2, and displacement magnifying means 4. The flap 6 is attached to the blade 2 via bearings so as to be angularly displaceable about a hinge shaft 5 which is arranged in the spanwise direction of the blade 2. The displacement magnifying means 4 has an output rod 7 and magnifies a displacement of the actuator 3 so as to displace the output rod 7 in the chordwise direction of the blade (the vertical direction in FIG. 1). An attachment portion 9 which downwardly protrudes is disposed in the flap 6. One end of the output rod 7 is coupled to the attachment portion 9 so as to be angularly displaceable about an axis which is arranged in the spanwise direction. When the output rod 7 is displaced in the chordwise direction of the blade, therefore, the flap 6 is angularly displaced around the hinge shaft 5 in a reciprocal manner.

The actuator 3 is configured by a stack-type piezo-actuator formed by stacking a thin plates of piezoceramic elements that are instantly deformed in the thickness direction to produce a displacement by applying a electric voltage. The actuator 3 is disposed so that its longitudinal direction is parallel to the spanwise direction of the blade 2, and expands or contracts in the longitudinal direction in response to a driving signal. An end of the actuator 3 on the side of the tip end of the blade 2 is fixed to the blade 2 by a fixation block 8. The opposite end of the actuator is not restrained. According to this configuration, when the rotor blade is rotated, a centrifugal force acts in the longitudinal direction of the actuator 3 so as to apply a preload on the piezo-actuator 3. A preload must be applied to a piezo-actuator in a displacement direction so as to avoid destruction by tensile force. Conventionally, a belleville spring or the like is used for this purpose (to apply pre-compression). In the invention, as described above, a preload is automatically applied by a centrifugal force, and hence it is not required to add a preloading member such as a spring.

Figure 2:
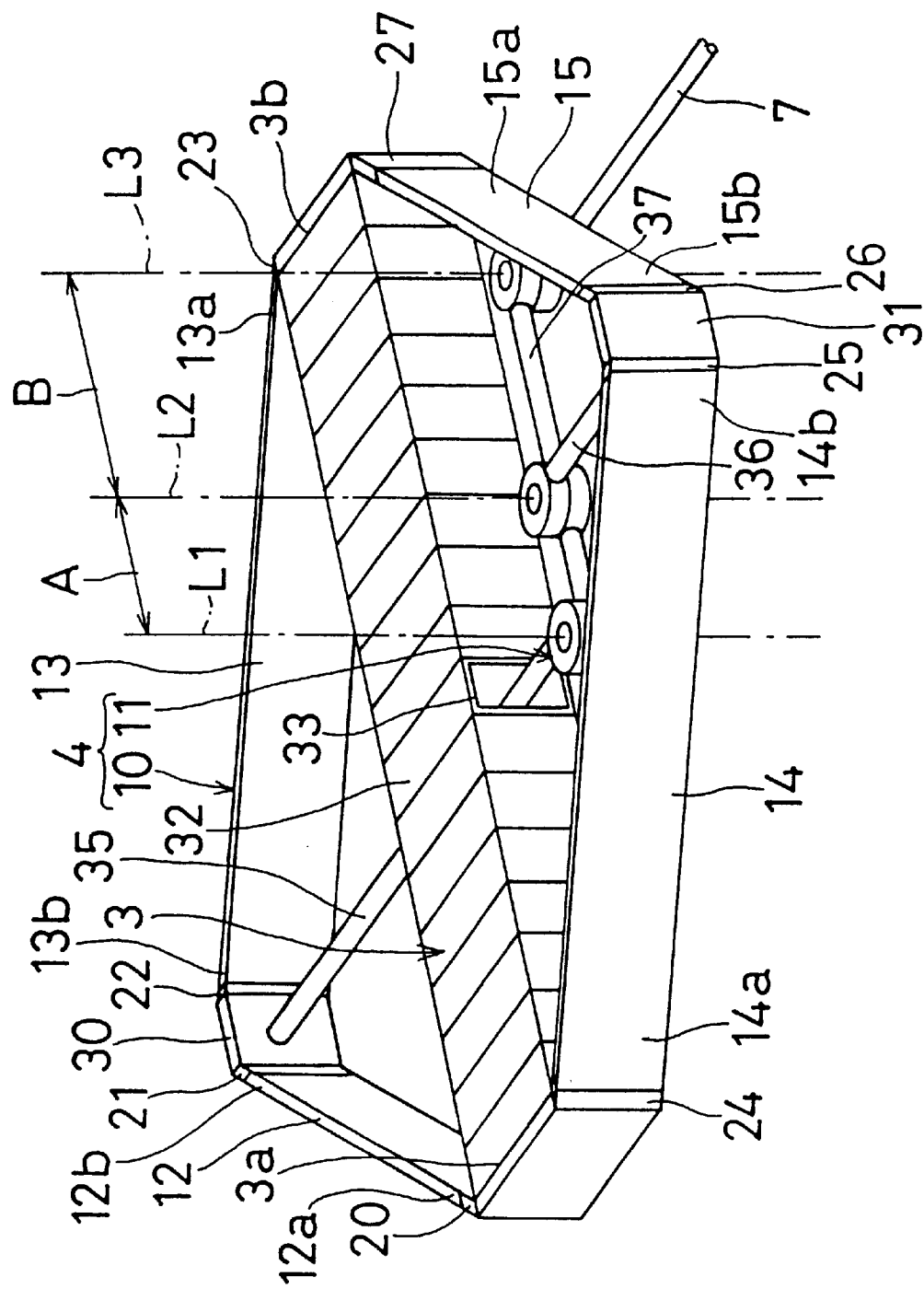
FIG. 2 is an enlarged perspective view of displacement magnifying means 4.

FIG. 2 is an enlarged perspective view showing the displacement magnifying means 4. The actuator 3 is configured into a rectangular column-like shape. According to this configuration, even when the blade 2 has a small housing space, the actuator 3 can be installed within the space. The section of the actuator 3 is not restricted to a rectangle, and may be adequately changed in accordance with the shape of the blade 2.

The displacement magnifying means 4 is configured by a first displacement magnifying mechanism 10 and a second displacement magnifying mechanism 11. The first displacement magnifying mechanism 10 has first to fourth links 12 to 15. The first link 12 and the second link 13 are disposed on the one side portion of the actuator 3 corresponding to the leading edge of the blade 2, and the third link 14 and the fourth link 15 are disposed on the other side portion of the actuator 3 corresponding to the trailing edge of the blade 2. One end 12a of the first link 12 is angularly displaceably coupled to one end 3a of the actuator 3 corresponding to the side of the root portion of the blade 2, and one end 13a of the second link 13 is angularly displaceably coupled to the other end 3b of the actuator 3. The other end 12b of the first link 12 is angularly displaceably coupled to the other end 13b of the second link 13 via first operation plate 30.

One end 14a of the third link 14 is angularly displaceably coupled to the one end 3a of the actuator 3, and one end 15a of the fourth link 15 is angularly displaceably coupled to the other end 3b of the actuator 3. The other end 14b of the third link 14 is angularly displaceably coupled to the other end 15b of the fourth link 15 via second operation plate 31.

Each of the links 12 to 15 is formed by a thin plate having a rigidity, and disposed so that the width direction is parallel to the vertical direction. One end 12a of the first link 12, and the one end 3a of the actuator 3 are coupled to each other by a hinge 20 so as to be angularly displaceable about a hinge axis which is arranged in the vertical direction, and the one end 13a of the second link 13, and the other end 3b of the actuator 3 are coupled to each other by a hinge 23 so as to be angularly displaceable about a hinge axis which is arranged in the vertical direction. The other end 12b of the first link 12, and the other end 13b of the second link 13 are coupled to each other via first operation plate 30. The first operation plate 30 and the first and second links 12 and 13 are coupled to each other by hinges 21 and 22 so as to be angularly displaceable about hinge axes which is arranged in the vertical direction.

With respect to the third and fourth links 14 and 15, similarly, one end 14a of the third link 14, and the one end 3a of the actuator 3 are coupled to each other by a hinge 24 so as to be angularly displaceable about a hinge axis which is arranged in the vertical direction, and the one end 15a of the fourth link 15, and the other end 3b of the actuator 3 are coupled to each other by a hinge 27 so as to be angularly displaceable about a hinge axis which is arranged in the vertical direction. A second operation plate 31 is disposed between the third link 14 and the fourth link 15. The second operation plate 31 and the third and fourth links 14 and 15 are coupled to each other by hinges 25 and 26 so as to be angularly displaceable about hinge axes which is arranged in the vertical direction.

The second displacement magnifying mechanism 11 is configured by an input shaft 35, a support shaft 36, and a displacement magnifying lever 37. In the actuator 3, an intermediate block 32 is disposed at a position opposed to the first operation plate 30. In the intermediate block 32, a through hole 33 which passes through the block is formed. The input shaft 35 of the second displacement magnifying mechanism 11 is fixed to the basal portion in the first operation plate 30, and passed through the through hole 33 of the intermediate block 32 to extend toward the side of the other side portion of the actuator 3. The support shaft 36 is fixed to the basal portion in the second operation plate 31, and extend toward the actuator 3. The displacement magnifying lever 37 is disposed on the other side portion of the actuator 3 so as to be substantially parallel to the actuator 3, and the intermediate portion is pin-jointed to the tip end of the support shaft 36 so as to be angularly displaceable about a support axis L2 which is arranged in the vertical direction thereof. A tip end of the input shaft 35 is pin-jointed to the one end of the root portion of the displacement magnifying lever 37 so as to be angularly displaceable about an input axis L1 which is arranged in the vertical direction. The other end of the output rod 7 is pin-jointed to the other end of the displacement magnifying lever 37 so as to be angularly displaceable about an output axis L3 which is arranged in the vertical direction.

The distance between the input axis L1 and the support axis L2 is considered as an input arm length A, and that between the support axis L2 and the output axis L3 as an output arm length B. The output arm length B is larger than the input arm length A. The relative displacement between the input shaft 35 and the support shaft 36 is magnified in accordance with the ratio of the input arm length A and the output arm length B.

Figure 3:
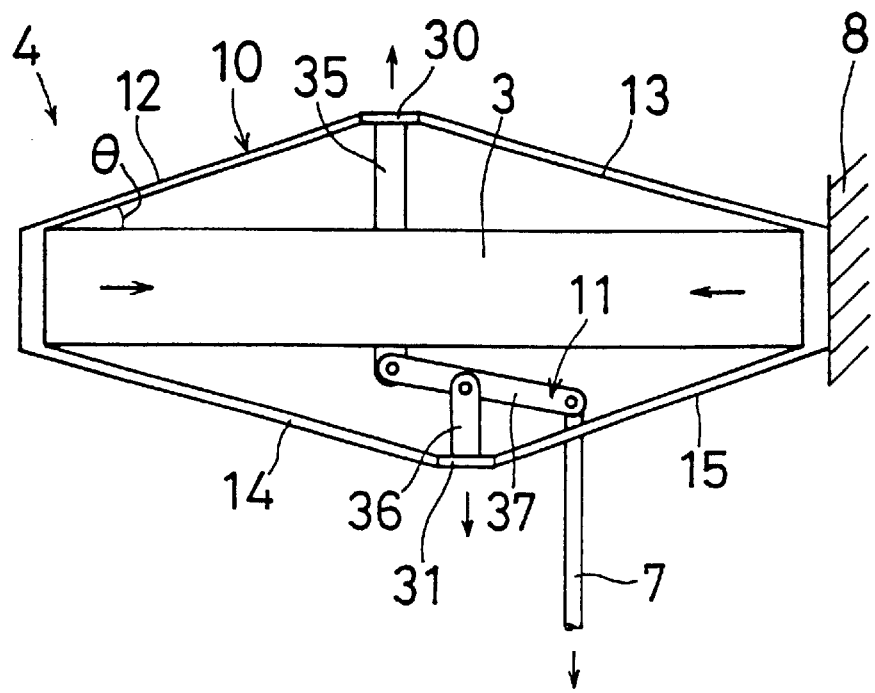
FIG. 3 is a plan view of the displacement magnifying means 4 in the case where an actuator 3 is contracted.
Figure 4:
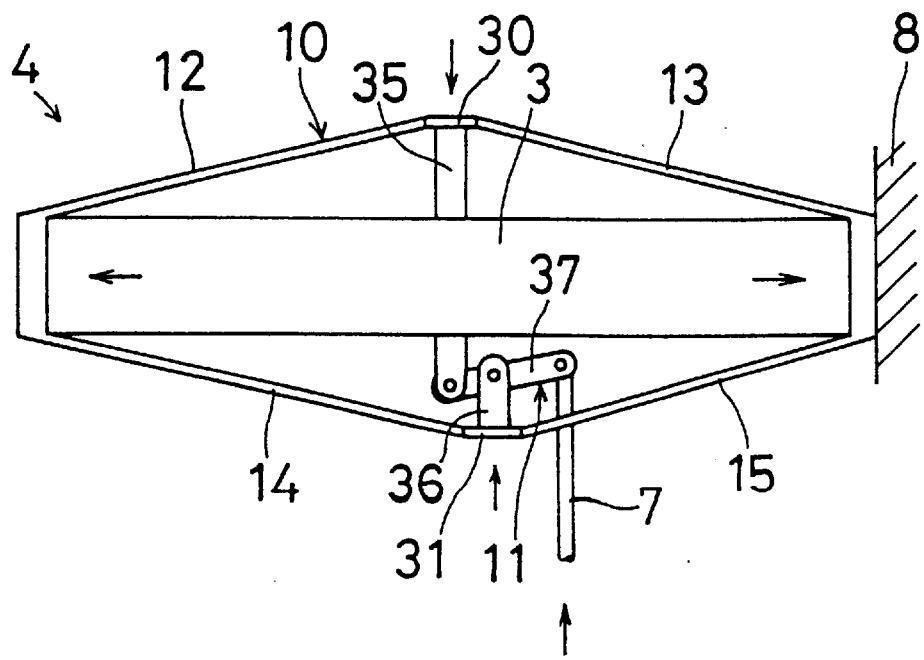
FIG. 4 is a plan view of the displacement magnifying means 4 in the case where the actuator 3 is expanded.

FIG. 3 is a plan view showing the displacement magnifying means 4 in the case where the actuator 3 is contracted, and FIG. 4 is a plan view showing the displacement magnifying means 4 in the case where the actuator 3 is expanded. As shown in the figures, for the actuator 3, the first link 12, and the second link 13 constitute a triangular link mechanism on the one side portion of the actuator 3, and similarly for the actuator 3, the third link 14, and the fourth link 15 constitute a triangular link mechanism on the other side portion of the actuator 3. When the actuator 3 expands or contracts, therefore, the first and second operation plates 30 and 31 which constitute apexes of the link mechanisms are displaced in a direction along which the operation plates approach or separate from each other. In the triangular link mechanisms, since the angle θ formed by the actuator 3 and the links 12 to 15 is very small, the amount of the expansion or contraction displacement of the actuator is magnified to be output displacement as a relative displacement between the operation plates 30 and 31. In this way, the displacement of the actuator 3 is magnified about 10 times by the first displacement magnifying mechanism 10.

As described above, the second displacement magnifying mechanism 11 magnifies a relative displacement between the input shaft 35 and the support shaft 36 which are connected to the first and second operation plates 30 and 31. Specifically, the displacement magnifying lever 37 is supported by the support shaft 36, the relative displacement between the support shaft 36 and the input shaft 35 is considered as an input displacement, and a displacement of the other end of the displacement magnifying lever 37 is considered as an output displacement. When the input arm length is A and the output arm length is B, the input displacement is magnified by a magnification factor of B/A. The magnified displacement is transmitted to the flap 6 by the output rod 7 coupled to the other end of the displacement magnifying lever 37.

As shown in FIGS. 3 and 4, the first link 12 and the fourth link 15 are equal in length to each other, and the second link 13 and the third link 14 are equal in length to each other and are sized to be slightly longer than the first and fourth links 12 and 15. According to this configuration, the input shaft 35 and the support shaft 36 are disposed in substantially parallel to each other with forming a small distance therebetween. The output rod 7 extends chordwise direction of the blade, and go through below the fourth link 15.

Figure 5:
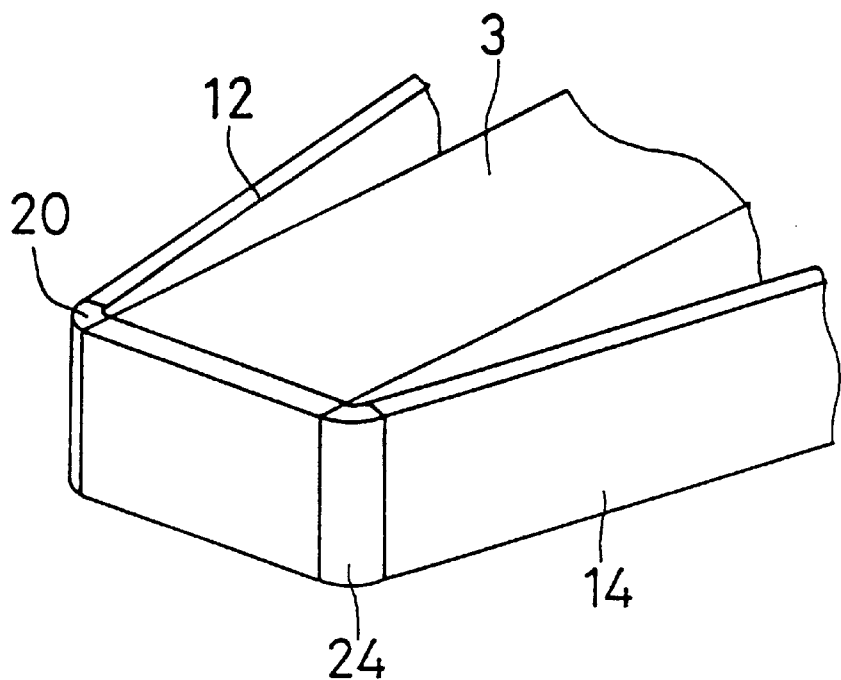
FIG. 5 is a perspective view showing an elastic hinge.

In the embodiment, the first to fourth links 12 to 15, the hinges 20 to 27, and the operation plates 30 and 31 are integrally and continuously constructed by a fiber-reinforced composite material. The hinges 20 to 27 are formed by a smaller amount of reinforcing fibers than the links so as to be more flexible than the links, and the reinforcing fibers are mainly oriented in the hinge axial direction (the width direction). As a result, the hinges are constructed as elastic hinges which are elastically deformable about the hinge axis. In this way, the hinges 20 to 27 are constructed as elastic hinges as shown in FIG. 5, so that the weight of the displacement magnifying means 4 can be reduced, and free play of the mechanical hinge is avoided. Since the links 12 to 15 are constructed by a composite material, secondary displacement of the second displacement magnifying mechanism 11 can be absorbed by small deflection of the links 12 to 15. According to this configuration, the second displacement magnifying mechanism 11 is allowed to smoothly operate.

Figure 6:
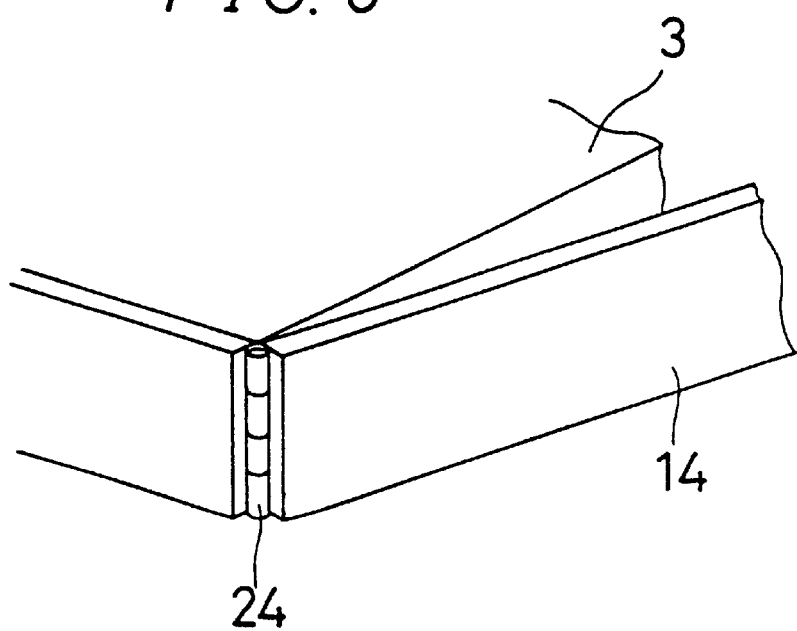
FIG. 6 is a perspective view showing a pin hinge.

In another embodiment, the hinges 20 to 27 are constructed by pin hinges as shown in FIG. 6. When such pin hinges are used, the hinges smoothly operate, so that expansion and contraction displacements of the actuator 3 can be properly transmitted.

The first displacement magnifying mechanism 10 receives an expansion or contraction displacement of the actuator as an input, and outputs a relative displacement between the first and second operation plates 30 and 31 which is magnified about 10 times. The second displacement magnifying mechanism 11 receives the relative displacement between the first and second operation plates 30 and 31 as an input, and further magnifies the displacement so that the displacement is finally magnified 20 to 40 times. By the first and second displacement magnifying mechanisms 10 and 11 which are configured as described above, a displacement of the actuator 3 which expands or contracts by about 100 to 200μpm can be magnified to about 2 to 8 mm.

Referring again to FIG. 1, a method of controlling the flap driving apparatus 1 will be described. The flap driving apparatus 1 is controlled by controlling means 40. A stroke sensor 42 which measures the stroke of the actuator 3 is built in the actuator 3, and a flap angle sensor 41 which detects the flap angle (the angle of an angular displacement) of the flap 6 is disposed in the flap 6.

The controlling means 40 produces a target signal based on the target angular displacement frequency and the target amplitude of the flap 6, calculates a command signal for the actuator 3 on the basis of the target signal, amplifies the command signal, and supplies the amplified signal to the actuator 3 as the driving signal. The stroke sensor 42 and the flap angle sensor 41 feedback a stroke signal of the actuator 3 and a flap angle signal of the flap 6 to the controlling means 40, respectively. The controlling means 40 performs a feedback control on the command signal on the basis of the target signal and the stroke signal so that the actuator 3 expands or contracts at the target frequency, and also on the command signal on the basis of the flap angle single and the target signal so that the flap 6 performs an angular displacement operation at the target angular displacement frequency and the target amplitude. As a result of such a feedback control, the flap 6 can be properly controlled.

Figure 7:
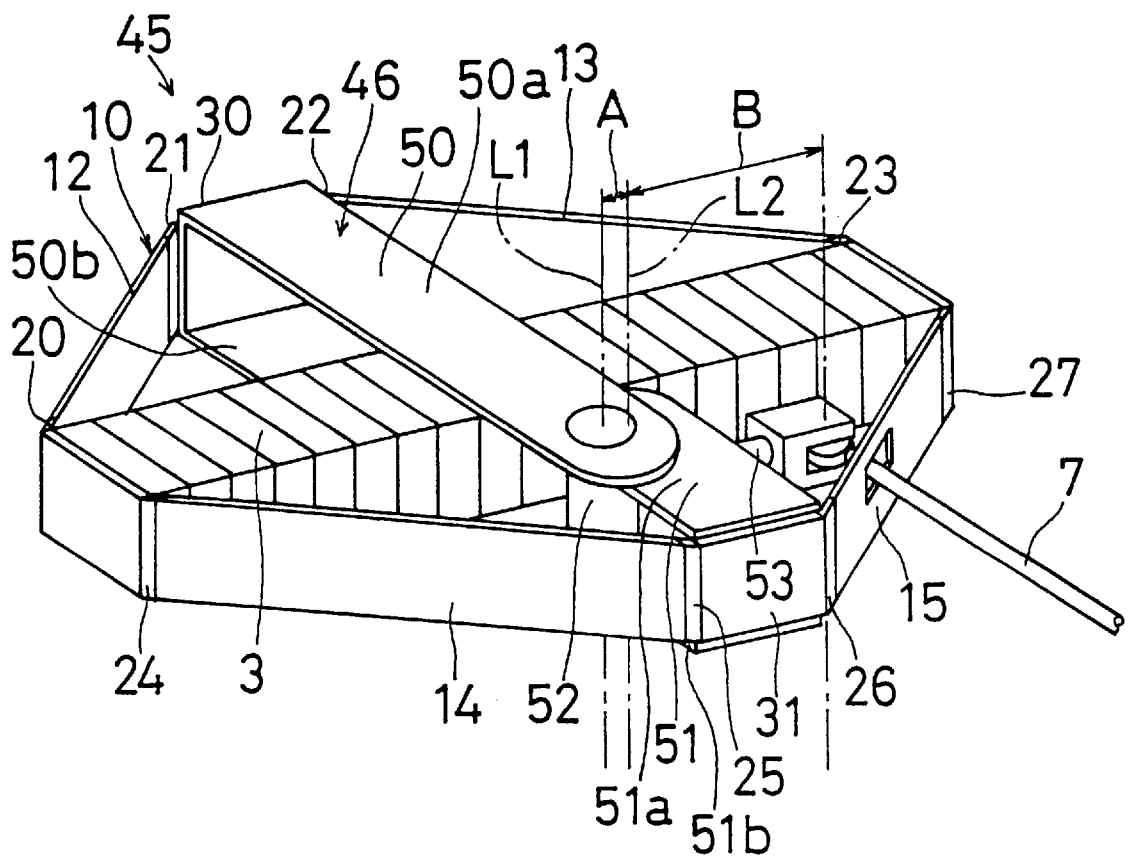
FIG. 7 is a perspective view showing displacement magnifying means 45 in another embodiment of the invention.
Figure 8:
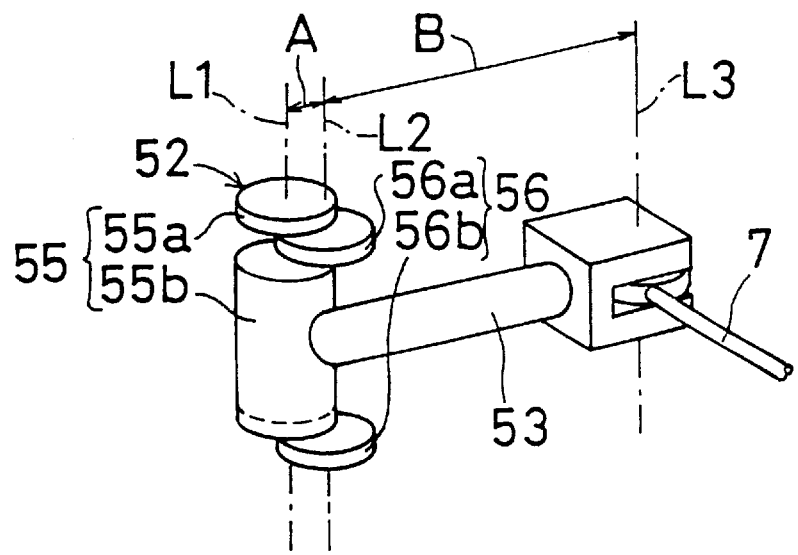
FIG. 8 is a perspective view showing an eccentric shaft 52 and a swing lever 53 of the displacement magnifying means 45.

FIG. 7 is a perspective view showing displacement magnifying means 45 of a flap driving apparatus which is another embodiment of the invention, and FIG. 8 is a perspective view showing an eccentric shaft 52 and a swing lever 53 of the displacement magnifying means 45. The displacement magnifying means 45 in the embodiment is similar to the displacement magnifying means 4 of the flap driving apparatus 1 shown in FIGS. 1 to 6, and is different only in the configuration of a second displacement magnifying mechanism 46. Therefore, only the second displacement magnifying mechanism 46 will be described, and description of the other components is omitted.

The second displacement magnifying mechanism 46 has an input arm 50, a support arm 51, the eccentric shaft 52, and the swing lever 53. The input arm 50 corresponds to the input shaft 35 of the second displacement magnifying mechanism 11 of the embodiment described above. The input arm is formed into a substantially U-like shape, has a pair of arm parts 50a and 50b, and is fixed to the basal portion in the first operation plate 30, and the arm parts 50a and 50b respectively extend above and below the actuator 3 so that their tip ends reach to the other side portion of the actuator 3. In this way, the input arm 50 is configured so as to sandwich the actuator 3. Unlike the second displacement magnifying mechanism 11, therefore, the intermediate block 32 having the through hole 33 is not required in the actuator 3.

The support arm 51 also is formed into a substantially U-like shape, fixed to the basal portion in the second operation plate 31, and has upper and lower arm parts 51a and 51b. The eccentric shaft 52 has an input shaft 55 and a support shaft 56. The input shaft 55 is divided into a first input shaft 55a and a second input shaft 55b, and the support shaft 56 also is divided into a first support shaft 56a and a second support shaft 56b. The first and second input shafts 55a and 55b have the common input axis L1, and the first and second support shafts 56a and 56b have the common support axis L2. The first and second support shafts 56a and 56b are fixed to the upper and lower ends of the second input shaft 55b, respectively. The first input shaft 55a is fixed onto the first support shaft 56a. The configured eccentric shaft 52 may be integrally shaped by machining. Alternatively, the shaft may be assembled into one unit with bolts by using individually machined components. The swing lever 53 is fixed to the second input shaft 55b which is the longest shaft, so as to be perpendicular to the input axis L1. The output rod 7 is coupled to the tip end of the swing lever so as to be angularly displaceable about the output axis L3.

The first input shaft 55a is pivotally supported by a tip end of the upper arm part 50a of the input arm 50 so as to be angularly displaceable about the input axis L1, and a lower end of the second input shaft 55b is pivotally supported by a tip end of the lower arm part 50b of the input arm 50 so as to be angularly displaceable about the input axis L1. The first support shaft 56a is pivotally supported by a tip end of the upper arm part 51a of the support arm 51 so as to be angularly displaceable about the support axis L2, and the second support shaft 56b is pivotally supported by a tip end of the lower arm part 51b of the support arm 51 so as to be angularly displaceable about the support axis L2.

In the second displacement magnifying mechanism 46 in the second embodiment, since the eccentric shaft 52 having the axes L1 and L2 which are mutually eccentric is used, the input arm length A which is equal to the distance between the input axis L1 and the support axis L2 can be arranged to be as short as possible. According to this configuration, the magnification factor of the second displacement magnifying mechanism 46 can be as large as about 10 times. As a result, the displacement, which has been magnified about 10 times by the first displacement magnifying mechanism 10, is finally magnified about 100 times. Therefore, the flap can be driven more effectively. Since the vertical position of the shafts 55a, 55b, 56a, and 56b are placed with being shifted from one another in the axial direction, the eccentric shafts 52 can be stably supported by the arms 50 and 51 by using bearings.

In the embodiment, each of the hinges 20 to 27 may be either of an elastic hinge or a mechanical pin hinge.

Figure 9:
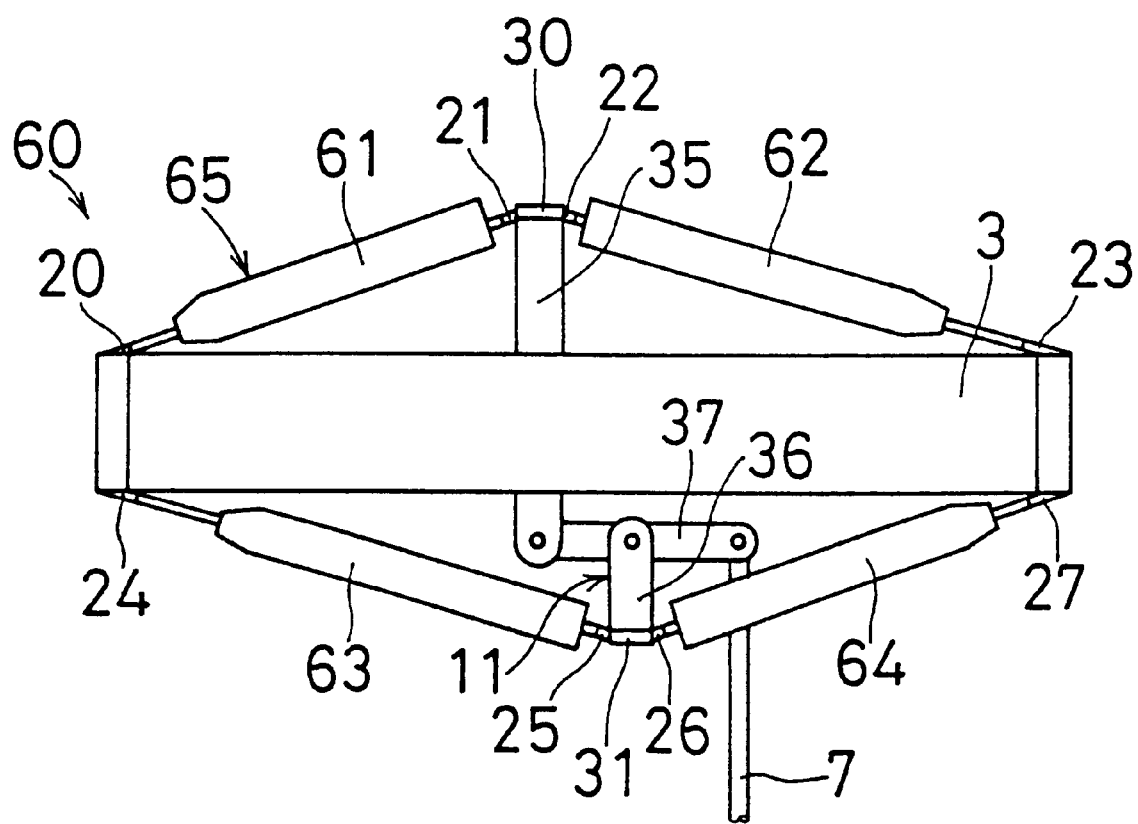
FIG. 9 is a plan view showing displacement magnifying means 60 in a further embodiment of the invention.

FIG. 9 is a plan view showing displacement magnifying means 60 in a further embodiment of the invention. The embodiment is similar to the flap driving apparatus 1 shown in FIGS. 1 to 6, and is different only in the configuration of a first displacement magnifying mechanism 65. Therefore, only the first displacement magnifying mechanism 65 will be described, and description of the other components is omitted.

In the embodiment, each of links 61 to 64 of the first displacement magnifying mechanism 65 are configured by a sub-actuator which expands or contracts in response to an incoming driving signal, and which is a stack-type piezo-actuator or a super magnetostrictive actuator. The links 61 to 64 expand and contract in an opposite phase relationship with respect to expansion and contraction of the main-actuator 3. When the main-actuator 3 contracts, the links 61 to 64 expand, and, when the main-actuator 3 expands, the links 61 to 64 contract. The controlling means 40 supplies a driving signal to the main-actuator 3 and the links 61 to 64 so that the expanding and contracting operation are performed in an opposite phase relationship as described above.

When the main-actuator 3 contracts, the first and second operation plates 30 and 31 are displaced in a direction along which the plates separate from each other. At this time, the links 61 to 64 expand, so that the first and second operation plates 30 and 31 are further displaced in the separating direction. By contrast, when the main-actuator 3 expands, the first and second operation plates 30 and 31 are displaced in a direction along which the plates approach each other. At this time, the links 61 to 64 contract, so that the first and second operation plates 30 and 31 are further displaced in the approaching direction. In this way, the links 61 to 64 expand and contract in an opposite phase relationship and in synchronization with the main-actuator 3, whereby the approaching/separating displacement of each of the first and second operation plates 30 and 31 can be further magnified. As a result, the magnification factor of the first displacement magnifying mechanism 65 can be further enhanced.

In a still further embodiment of the invention, the links 61 to 64 which expand and contract as described above may be used as the links 12 to 15 of the displacement magnifying means 45 shown in FIG. 7.

In a still further embodiment, a plurality of the actuators 3 and the displacement magnifying means 4 may be arranged in the spanwise direction so that the flap 6 is angularly displaced by the plurality of actuators 3. When the plurality of actuators 3 are arranged as described above, it is possible to obtain a large driving force, and hence the flap 6 can be angularly displaced in a sufficient angle.

The actuator 3 is not restricted to a stack-type piezo-actuator, and may be a super magnetostrictive actuator or an actuator of any other kind. A super magnetostrictive actuator is an actuator which expands and contracts in accordance with a change of a magnetic field that is generated by an electromagnetic coil. In such a super magnetostrictive actuator also, when the actuator is to be operated, the actuator must be compressed in the displacement direction so as to be preloaded. When a super magnetostrictive actuator is disposed along the spanwise direction of the blade 2, the one end of the actuator on the side of the tip end of the blade is fixed to the blade, and the other end of the actuator on the side of the root portion of the blade is attached so that its displacement is not restrained, the super magnetostrictive actuator is automatically preloaded by the centrifugal force due to rotation of the rotor blade. According to this configuration, it is not required to use an additional spring or the like in order to apply a preload.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A rotor blade flap driving apparatus comprising:

a blade;

a flap angularly displaceably attached to a trailing edge of the blade;

an actuator housed in the blade, which expands and contracts in a spanwise direction of the blade thereof; and displacement magnifying means for magnifying the displacements of the actuator and transmitting the magnified displacements to the flap to angularly displace the flap in a vertical direction thereof, the displacement magnifying means including:

a first displacement magnifying mechanism having:
 a first link disposed on one side portion of the actuator, one end of the first link being angularly displaceably coupled to one end of the actuator,
 a second link disposed on the one side portion of the actuator, one end of the second link being angularly displaceably coupled to another end of the actuator, another end of the second link being angularly displaceably coupled to another end of the first link, a third link disposed on the other side portion of the actuator, one end of the third link being angularly displaceably coupled to the one end of the actuator; and a fourth link disposed on the other side portion of the actuator, one end of the fourth link being angularly displaceably coupled to the other end of the actuator, another end of the fourth link being angularly displaceably coupled to another end of the third link, the first displacement magnifying mechanism being a mechanism for magnifying expansion and contraction displacements of the actuator by moving in a direction along which the coupling portion between the first and second links, and the coupling portion between the third and fourth links approach and separate from each other in accordance with expansion and contraction of the actuator; and a second displacement magnifying mechanism having an input member which is coupled to the first displacement magnifying mechanism and output rod, one end of which is coupled to the flap for magnifying a displacement of the first displacement magnifying mechanism.

2. The rotor blade flap driving apparatus of claim 1, wherein the second displacement magnifying mechanism has:

an input member which is connected to one of the coupling portion between the first and second links, and the coupling portion between the third and fourth links;

a support member which is connected to another one of the coupling portion between the first and second links, and the coupling portion between the third and fourth links; and a displacement magnifying member which is supported by the support member so as to be angularly displaceable about a predetermined support axis, and to which the input member is coupled so as to be angularly displaceable about an input axis that is separated from the support axis by a predetermined input arm length, and another end of the output rod is coupled to the displacement magnifying member so as to be angularly displaceable about an output axis which is separated from the support axis by an output arm length which is larger than the input arm length.

3. The rotor blade flap driving apparatus of claim 1, wherein the first to fourth links, the coupling portions between the first to fourth links and the actuator, between the first and second links, and between the third and fourth links are continuously formed by a thin rigid plate made by composite material, and the coupling portions are constructed so as to be more flexible than the links and elastically deformable.

4. The rotor blade flap driving apparatus of claim 2, wherein the first to fourth links, the coupling portions between the first to fourth links and the actuator, between the first and second links, and between the third and fourth links are continuously formed by a thin rigid plate made by composite material, and the coupling portions are constructed so as to be more flexible than the links and elastically deformable.

5. The rotor blade flap driving apparatus of claim 1, wherein the couplings between the first to fourth links and the actuator, the first and second links, and the third and fourth links are constructed by pin hinges so as to be angularly displaced.

6. The rotor blade flap driving apparatus of claim 2, wherein the couplings between the first to fourth links and the actuator, the first and second links, and the third and fourth links are constructed by pin hinges so as to be angularly displaced.

7. The rotor blade flap driving apparatus of claim 1, wherein the actuator consists of a stack-type piezoactuator in which a plurality of piezoceramic elements which are displaced in accordance with applied voltage are stacked, and is disposed so that displacement direction of the piezoceramic elements are spanwise direction of the blade, and one end of the actuator on a side of a tip end of the blade is fixed to the blade.

8. The rotor blade flap driving apparatus of claim 2, wherein the actuator consists of a stack-type piezo-actuator in which a plurality of piezoceramic elements which are displaced in accordance with applied voltage are stacked, and is disposed so that displacement direction of the piezoceramic elements are spanwise direction of the blade, and one end of the actuator on a side of a tip end of the blade is fixed to the blade.

9. The rotor blade flap driving apparatus of claim 1, wherein each of the first to fourth links is configured by a sub-actuator which expands and contracts in a longitudinal direction thereof, and the link expands and contracts in an opposite phase relationship with respect to expansion and contraction of the main-actuator.

10. The rotor blade flap driving apparatus of claim 2, wherein each of the first to fourth links is configured by a sub-actuator which expands and contracts in a longitudinal direction thereof, and the link expands and contracts in an opposite phase relationship with respect to expansion and contraction of the main-actuator.

* * * * *